(12) United States Patent
Doi (10) Patent No.: US 7,385,491 B2
(45) Date of Patent: Jun. 10, 2008

(54) TAMPER MONITOR CIRCUIT (75) Inventor: Bryan C. Doi, Queen Creek, AZ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 11/238,480

(22) Filed: Sep. 28, 2005

(65) Prior Publication Data

US 2007/0069875 A1 Mar. 29, 2007

(51) Int. Cl.
*B60Q 1/00* (2006.01)

(52) U.S. Cl. ............ 340/440; 340/441; 340/653; 340/309.7; 235/380; 235/486; 235/488; 235/492

(58) Field of Classification Search ............ 340/440, 340/441, 653, 309.7; 235/380, 486, 488, 235/492
See application file for complete search history.

(56) References Cited

U.S. PATENT DOCUMENTS

| | | |
|---|---|---|
| 3,993,984 A | 11/1976 | Penrod |
| 4,906,979 A | 3/1990 | Kimura |
| 5,060,261 A | 10/1991 | Avenier et al. |
| 5,097,253 A | 3/1992 | Eschbach et al. |
| 5,998,858 A | 12/1999 | Little et al. |
| 6,201,296 B1 | 3/2001 | Fries et al. |
| 6,330,668 B1 | 12/2001 | Curiger et al. |
| 6,507,247 B2 | 1/2003 | Langston |
| 6,745,331 B1 | 6/2004 | Silverbrook |
| 2002/0036879 A1 | 3/2002 | Vacherand et al. |
| 2004/0189355 A1 | 9/2004 | Walmsley |

*Primary Examiner*—Tai Nguyen
(74) *Attorney, Agent, or Firm*—Davidson Berquist Jackson & Gowdey LLP (57) ABSTRACT

A tamper monitor circuit detects voltage, temperature, and/or clock variations that may be associated with a circuit tampering technique, and triggers an appropriate tamper response. The tamper monitor circuit includes a reference oscillator, a detection oscillator, and a comparison circuit. The reference oscillator supplies a reference signal having a reference frequency. The detection oscillator operates at a circuit temperature and is energized with a supply voltage, and supplies a detection signal having a frequency that varies with variations in the circuit temperature, variations in the supply voltage, or both. The comparison circuit receives the reference signal and the detection signal and, in response to the reference signal, selectively determines the frequency of the detection signal, determines a frequency difference between two or more of the determined frequencies, and supplies a tamper detect signal if the determined frequency difference exceeds a predetermined difference threshold.

21 Claims, 4 Drawing Sheets

TAMPER MONITOR CIRCUIT

TECHNICAL FIELD

The present invention generally relates to tamper monitoring and, more particularly, to a tamper monitoring circuit that accurately detects tampering actions that result in or from temperature, voltage, and/or reference clock variances.

BACKGROUND

Microcontrollers and various other embedded circuit devices are used in, or used as, secure electronic devices that perform various types of secure transactions, and to store various types of secure data. For example, secure electronic devices are more and more being used to conduct secure currency transfers, secure information transfers, and secure data storage operations. As a result of the increased usage of microcontrollers, and similar circuit devices, for storing and transferring secure information and data, there has also been an increase in the number of people dedicated to, and the number of techniques developed for, reverse engineering secure electronic devices.

Various non-destructive reverse engineering techniques have been developed for attacking secure electronic devices. Many of these non-destructive techniques utilize variations in system voltages (e.g., over/under voltage), temperature variations, and/or clock frequency. As is generally known, varying one or more of these parameters can cause the device to transfer into an unanticipated operational mode or state, which may compromise the security of the device. Thus, many secure electronic devices may include a tamper monitor circuit that causes the device to reset if the supply voltage, clock frequency, or circuit temperature reaches a particular threshold.

Although present monitor circuits do provide a level of tamper monitoring and protection, these circuits also suffer certain drawbacks. For example, some monitor circuits rely, at least in part, on various device level characteristics, such as transistor switching speed, which can be sensitive to variations in the device manufacturing process. Moreover, some monitor circuits undesirably issue false tamper alarms as a result of fluctuations in clock frequency that frequently occur when a device is powered up and stabilizing. In addition, some monitor circuits either overreact or underreact to various under-voltage and over-voltage transients, which can result in the issuance of false tamper alarms or failure to detect legitimate tampering operations.

Hence, there is a need for a circuit that is capable of detecting voltage, temperature, and/or clock variations that may be associated with a circuit tampering technique, and to trigger an appropriate tamper response, and to do so without issuing an inordinate number of false tamper responses and/or failing to detect an inordinate number of actual tampering attempts and/or is not sensitive to process variations. The present invention addresses one or more of these needs.

BRIEF SUMMARY

The present invention provides a tamper monitor circuit that detects voltage, temperature, and/or clock variations that may be associated with a circuit tampering technique, and triggers an appropriate tamper response. In one embodiment, and by way of example only, a tamper monitor circuit includes a reference oscillator, a detection oscillator, and a comparison circuit. The reference oscillator is operable to supply a reference signal having a reference frequency. The detection oscillator is configured to operate at a circuit temperature and to be energized with a supply voltage, and is operable to supply a detection signal having a frequency that varies with variations in the circuit temperature, variations in the supply voltage, or both. The comparison circuit is coupled to receive the reference signal and the detection signal and is operable, in response to the reference signal, to selectively determine the frequency of the detection signal, determine a frequency difference between two or more of the determined frequencies, and supply a tamper detect signal if the determined frequency difference exceeds a predetermined difference threshold.

In another exemplary embodiment, a tamper monitor circuit includes a reference oscillator, a detection oscillator, and a comparison circuit. The reference oscillator is configured to operate at a first circuit temperature and to be energized with a supply voltage, and is operable to supply a reference signal having a frequency that varies, in accordance with a first sensitivity, with variations in the first circuit temperature, variations in the supply voltage, or both. The detection oscillator is configured to operate at a second circuit temperature and to be energized with the supply voltage, and is operable to supply a detection signal having a frequency that varies, in accordance with a second sensitivity that differs from the first sensitivity, with variations in the second circuit temperature, variations in the supply voltage, or both. The comparison circuit is coupled to receive the reference signal and the detection signal and is operable, in response to the reference signal, to selectively determine the frequency of the detection signal, determine a frequency difference between two or more of the determined frequencies, and supply a tamper detect signal if the determined frequency difference exceeds a predetermined difference threshold.

In yet another exemplary embodiment, a tamper monitor circuit includes a reference oscillator, a detection oscillator, a detection counter, a reference counter, a reference count comparator, a detection count capture circuit, and a controller. The reference oscillator is operable to supply a reference signal having a reference frequency. The detection oscillator configured to operate at a circuit temperature and to be energized with a supply voltage, and is operable to supply a detection signal having a frequency that varies with variations in the circuit temperature, variations in the supply voltage, or both. The detection counter is coupled to receive the detection signal and is operable to generate a detection count value representative of a number of detection signal periods. The reference counter is coupled to receive the reference signal and is operable to generate a reference count value representative of a number of reference signal periods. The reference count comparator is coupled to the reference counter, and is operable to determine when the reference count value reaches a predetermined comparator count value and, upon determining that the reference count reaches the predetermined comparator count value, to supply a count capture command. The detection count capture circuit is coupled to the detection counter and the reference count comparator, is coupled to receive the count capture command, and is operable, in response to the count capture command, to capture the detection count value. The controller circuit is coupled to the detection count capture circuit and is operable to selectively retrieve the detection count value from the detection count capture circuit, compare the retrieved detection count value to a baseline detection count value, and supply a tamper detect signal if the retrieved detection count value differs from the baseline detection count value by a predetermined threshold magnitude.

BRIEF DESCRIPTION OF THE DRAWINGS

The present invention will hereinafter be described in conjunction with the following drawing figures, wherein like numerals denote like elements, and wherein.

DETAILED DESCRIPTION OF PREFERRED EMBODIMENTS

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
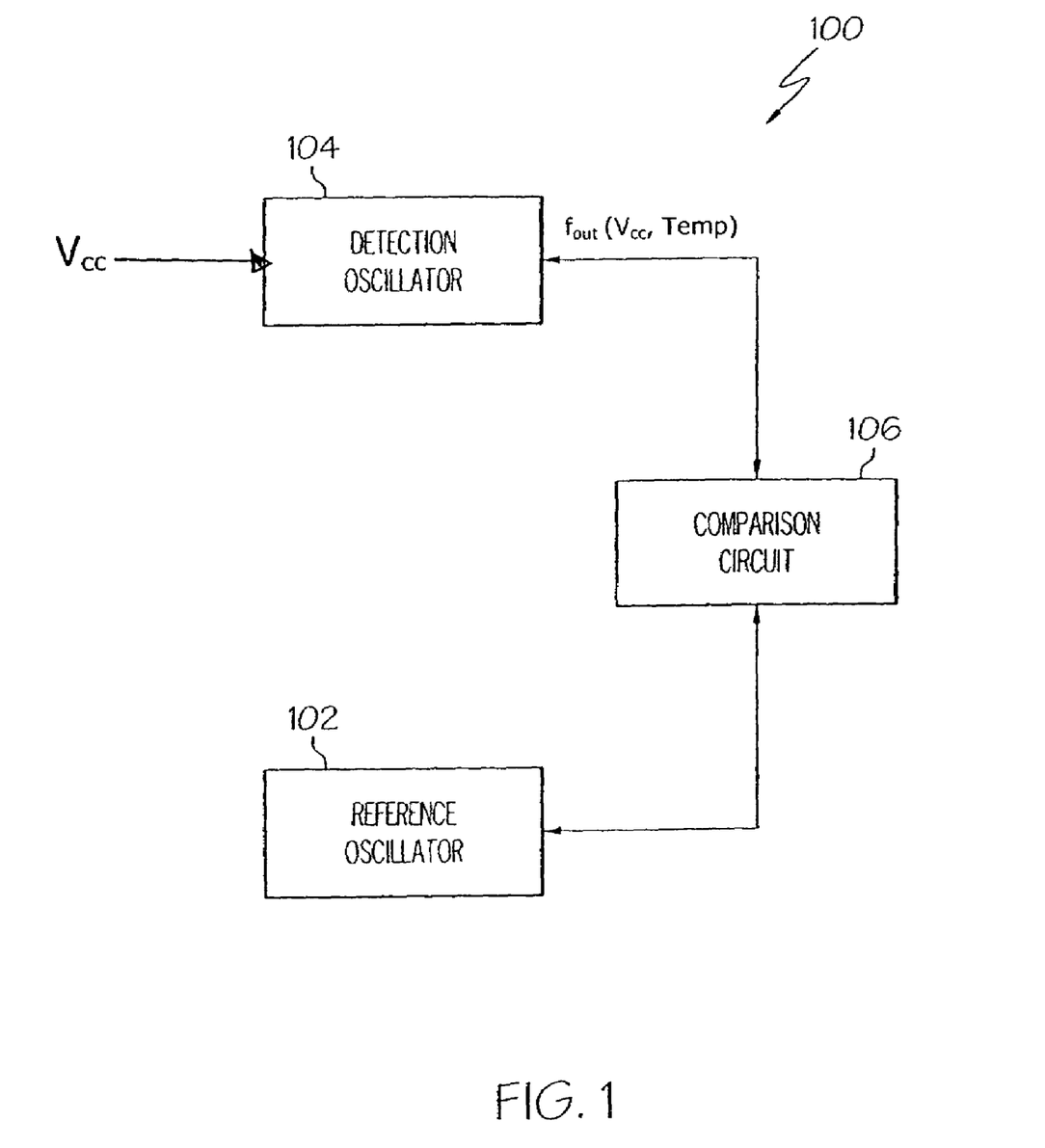
FIG. 1 is functional block diagram of an exemplary tamper monitor circuit according to the present invention.

A functional block diagram of an exemplary monitor circuit 100 is depicted in FIG. 1 and includes a reference oscillator 102, a detection oscillator 104, and a comparison circuit 106. The circuits 102-106 that comprise the monitor circuit 100 each operate at the same or different circuit temperature, and are each energized with a supply voltage that is supplied from one or more non-illustrated power supplies. For example, the reference oscillator 102, the detection oscillator 104, and the comparison circuit 106 could all be energized from the same power supply, or one or more of the circuits 102-106 could be energized from separate power supplies. Preferably, each of the circuits 102-106 that comprise the monitor circuit 100 operate at similar circuit temperatures, and are energized from a single power supply. Each of the individual circuits 102-106 will now be described in more detail.

The reference oscillator 102 supplies a reference signal at a substantially fixed reference frequency. The reference oscillator 102 may be implemented using any one of numerous oscillator circuits that are configured to supply a relatively stable, substantially fixed-frequency signal. The reference oscillator 102 may be, for example, a system clock or a base clock from which the system clock is derived. Preferably, the reference oscillator 102, during normal operation, is a relatively stable, frequency invariant signal source. Nonetheless, it will be appreciated that the reference oscillator 102 could be implemented using a circuit that is sensitive to temperature and supply voltage changes. Preferably, however, its temperature and voltage sensitivity is relatively low. More preferably, its sensitivity to temperature and voltage variations should be much lower than the sensitivity of the detection oscillator 104 to these parameter variations. It will additionally be appreciated, as was alluded to above, that the reference oscillator 102 may be located remotely from the detection oscillator 104 and comparison circuit 106, or it may be disposed on the same circuit board or within the same integrated circuit package as the detection oscillator 104 and/or the comparison circuit 106. Preferably, the reference oscillator 102 is implemented using a system or circuit clock that is used, for example, to synchronize the operations of one or more non-illustrated external circuits and/or the monitor circuit 100 itself.

The detection oscillator 104 supplies a detection signal having a frequency that varies with variations in the ambient temperature and with variations in the supply voltage. As indicated above, the sensitivity of the detection oscillator 104 to variations in ambient temperature and/or supply voltage is preferably different from the sensitivity of the reference oscillator 102. The detection oscillator 104 may also be implemented using any one of numerous types of oscillator circuits that supply voltage and/or temperature dependent frequency signals, but in a particular preferred embodiment the detection oscillator 104 is implemented as a ring oscillator circuit.

The comparison circuit 106 is coupled to receive both the reference signal and the detection signal and, based on each of these signals, determines whether the monitor circuit 100, and/or other non-illustrated circuits in the system in which the monitor circuit 100 is installed, and/or the system itself, is being subjected to one or more tampering techniques that implement, or result in, changes in circuit temperature, changes in supply voltage, or both. To do so, the comparison circuit 106, partially in response to the reference signal, determines the frequency of the detection signal at least at two separate times. The comparison circuit 106 then determines the difference in frequency between two or more of the determined frequencies. If, the determined frequency difference exceeds a predetermined difference threshold, the comparison circuit 106 will issue a tamper detect signal.

The monitor circuit 100 and other non-illustrated circuits within the system the monitor circuit 100 is installed may be configured and/or programmed to respond in any one of numerous ways to the tamper detect signal. For example, the circuits may be configured to implement a circuit and/or system reset operation, to partially or wholly disable circuit and/or system operation, to issue an audible or visual alarm (or both), or various combinations of these responses. It will be appreciated that the circuits and systems are preferably configured such that the response to the tamper detect signal is programmable. A particular response to the tamper detect signal is described in more detail further below.

The monitor circuit 100, and most notably the detection oscillator 104 and the comparison circuit 106 may be implemented using any one of numerous types of circuits or plurality of circuit elements that are coupled together in any one of numerous configurations to perform the function described herein. A particular preferred embodiment of the detection oscillator 104 and comparison circuit 106 are depicted in FIG. 2, and with reference thereto will now be described in detail.

The reference oscillator 104 is preferably implemented as a free-running ring oscillator 202. It will be appreciated that the depicted ring oscillator is merely exemplary of one of numerous types of ring oscillators that may be used to implement the reference oscillator 104. Moreover, various other types of oscillators, not just a ring oscillator, may be used to implement the reference oscillator 104. Nonetheless, the ring oscillator 202 includes a NAND logic circuit 204, and a plurality of inverters 206-1, 206-2, 206-3, . . . 206-N. The NAND logic circuit 204 includes two input terminals, one of which is coupled to the input of one of the inverters 206-N, and the other of which is coupled to receive an ENABLE signal. Thus, when the ENABLE signal is at a logic "1" value, the ring oscillator 202 will oscillate and supply the detection signal to the comparison circuit 106. However, when the ENABLE signal is at a logic "0" value, the ring oscillator will cease supplying the detection signal. This configuration allows the reference oscillator to be selectively enabled and disabled, as desired, which allows for variation in sampling periods (discussed further below) and can reduce overall power consumption.

Figure 2:
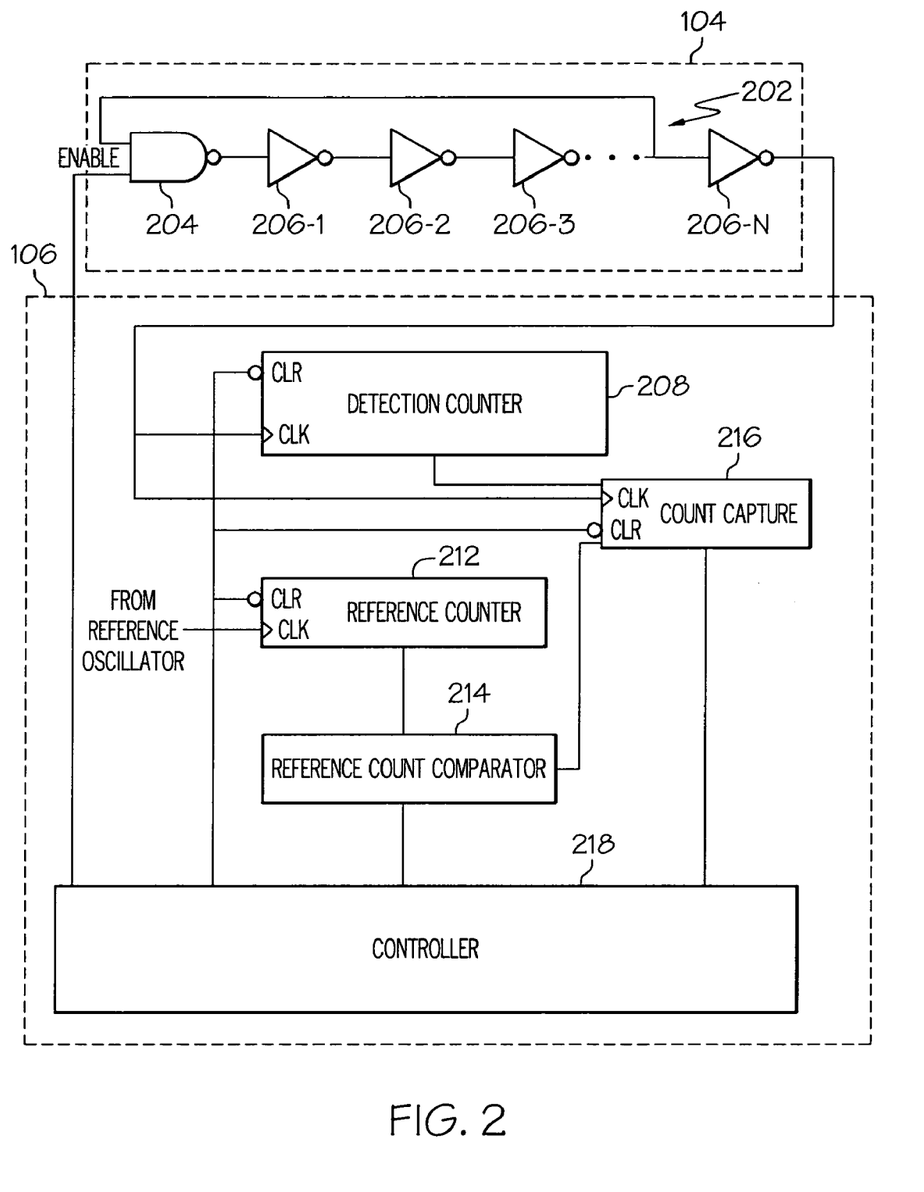
FIG. 2 is a functional block diagram of a portion of the exemplary tamper monitor circuit of FIG. 1, depicting portions thereof in more detail.

As is generally known, a free-running ring oscillator, such as the ring oscillator 202 depicted in FIG. 2, will generate a substantially fixed-frequency output signal. However, it is also generally known that the ring oscillator frequency will vary with variations in processing, supply voltage magnitude, and circuit temperature. Thus, variations in the detection signal frequency may be indicative of variations in supply voltage magnitude, circuit temperature, and/or one or more process dependent effects. As will be explained further below, relative values of the detection signal frequency, rather than absolute values, are used to detect circuit tamper operations. Therefore, any process dependent effects associated with the ring oscillator 202 are negated, leaving detection signal frequency variations as being caused by variations in supply voltage magnitude, circuit temperature, or both. As will also be explained further below, such variations thus are used to indicate potential circuit tampering.

The comparison circuit 106, which is coupled to receive the reference signal from the reference oscillator 102 (not shown in FIG. 2) and the detection signal from the detection oscillator 104, includes a detection counter 208, a reference counter 212, a reference count comparator 214, a detection count capture circuit 216, and a controller 218. The detection counter 208 is coupled to receive the detection signal via a CLK input terminal and is configured, as long as it is energized and receiving the detection signal, to count the number of detection signal periods (or "clocks") and generate a detection count value representative thereof. As FIG. 2 also depicts, the detection counter 208 includes a CLR terminal that, when supplied with a logic "1" value, causes the detection counter 208 to reset the detection count value to zero. It will be appreciated that the detection counter 208 may be implemented using any one of numerous circuits that are configured (or configurable) to count the number of periods (or "clocks") of a signal.

The reference counter 212 is coupled to receive the reference signal and operates, and is configured, substantially identical to the detection counter 208. That is, as long as the reference counter 212 is energized and receiving the reference signal, the reference counter 212 counts the number of reference signal periods (or "clocks") and generates a reference count value representative thereof. The reference counter 212 also includes a CLR terminal that, when supplied with a logic "1" value, causes the reference counter 212 to reset the reference count value to zero. Like the detection counter 208, it will be appreciated that the reference counter 212 may be implemented using any one of numerous circuits that are configured (or configurable) to count the number of periods (or "clocks") of a signal.

The reference count comparator 214 is in operable communication with the controller 218 and is configured to receive, and store, a predetermined comparator count value supplied from the controller 218. The reference count comparator 214 is also in operable communication with the reference counter 212 and is operable to determine when the reference count value in the reference counter 212 equals the predetermined comparator count value. The reference count comparator 214 is additionally operable, upon determining that the reference count value equals the predetermined comparator count value, to supply a count capture command. As will now be explained, the detection count capture circuit 216 is responsive to the count capture command.

The detection count capture circuit 216 is in operable communication with the detection counter 208 and the reference count comparator 214 and, in response to the count capture command supplied from the reference count comparator 214, captures the detection count value in the detection counter 208. The detection count capture circuit 216 is also in operable communication with the controller circuit 218 and, upon capturing the detection count value, supplies a capture signal to the controller circuit 218, informing it that a detection count value is available for storage and/or comparison.

The controller circuit 218 is in operable communication with the detection counter 208, the reference counter 212, the reference count comparator 214, and the detection count capture circuit 216, and controls the overall operation of the monitor circuit 100. In particular, the controller circuit 218, among other functions, supplies appropriate signals to enable and disable the detection oscillator 104, to reset the detection counter 208 and the reference counter 212, and to supply the predetermined comparator count value to the reference count comparator 214. The controller circuit 218, in response to the capture signal supplied from the detection count capture circuit 216, retrieves the detection count value from the detection count capture circuit 216. The controller circuit 218 is further operable, upon retrieving the detection count value, to compare the retrieved detection count value to a baseline detection count value. If the retrieved detection count value differs from the baseline detection count value by a predetermined threshold magnitude, the controller circuit 218 will supply the previously-described tamper detect signal.

It will be appreciated that the controller circuit 218 may be implemented using any one of numerous programmable circuits including, for example, a processor, a microcontroller, or a state machine, just to name a few. It will additionally be appreciated that one or more of the functional circuit elements described herein may be implemented in hardware, software, firmware, or various combinations thereof, and may be included within the same circuit package or implemented as one or more individual circuit elements or integrated circuit packages.

Having described the overall structure of the monitor circuit 100 and the various individual functions of each of the elements that comprise the monitor circuit 100, a detailed description of the overall operation of the monitor circuit 100, at least according to a particular embodiment, will now be described. In doing so, reference should be made to FIG. 3, which depicts the overall process 300 in flowchart form, in combination with FIG. 2, as needed or desired. It is noted that the parenthetical references in the following discussion correspond to the numerically referenced steps of the flowchart depicted in FIG. 3. It is additionally noted that some of the process steps are depicted and described as being implemented in a sequential order. However, it will be appreciated that this is done merely for ease of both description and illustration, and that various of the steps depicted in FIG. 3 and described alone may be implemented substantially simultaneously or in a different order than what is shown and described.

Figure 3:
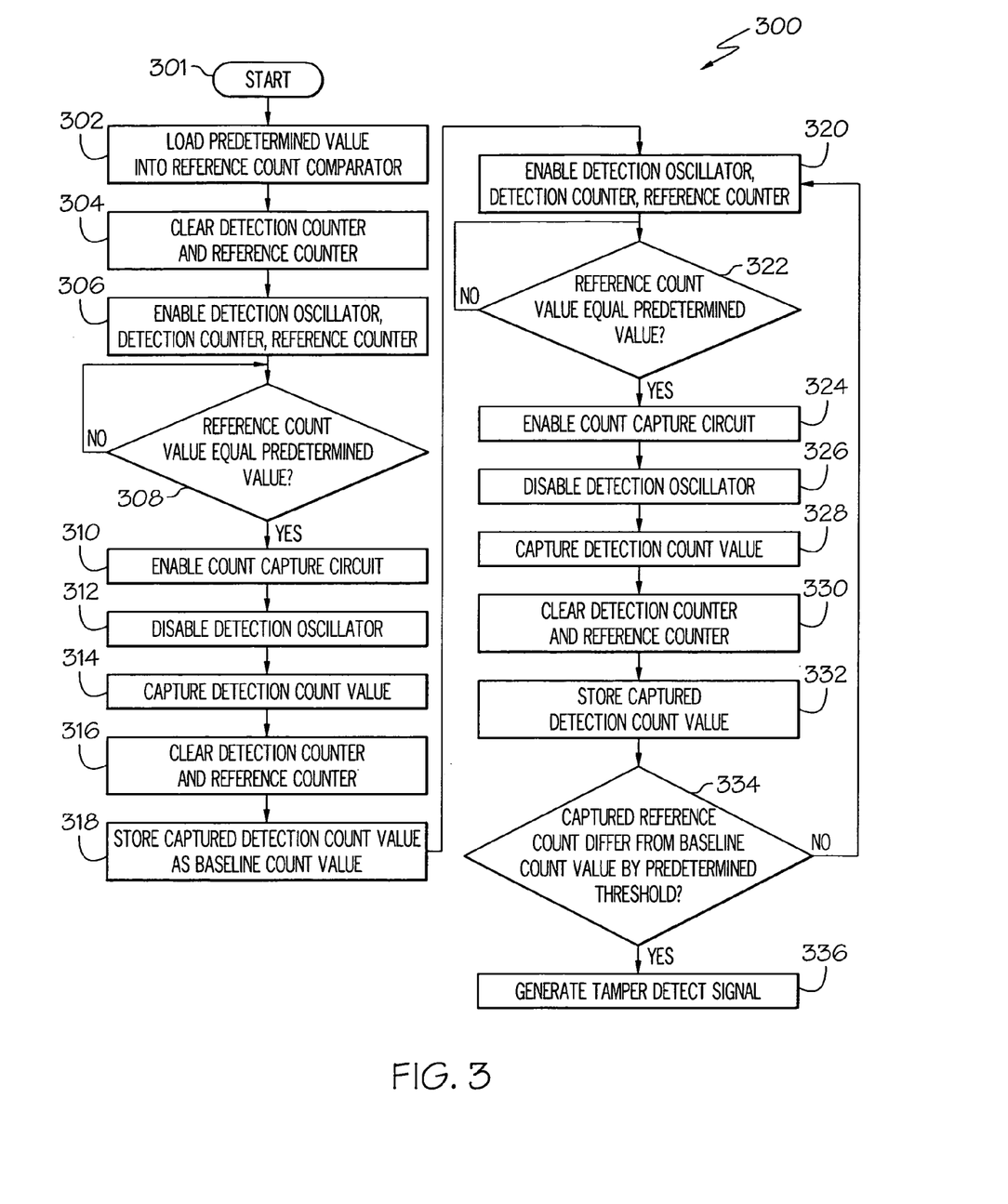
FIG. 3 is a flowchart depicting an exemplary process implemented by the tamper monitor circuit depicted in FIGS. 1 and 2.

The process 300 begins (301) following, for example, a system or circuit reset or upon system or circuit power-up. In either case, after a suitable settling time following a reset or power-up operation, which ensures at least that the reference oscillator 102 is stable, the process 300 implemented by the monitor circuit 100 initially attains and stores a baseline detection count value for subsequent comparison purposes. In the depicted embodiment, this is accomplished by the controller circuit 218 loading the predetermined comparator count value into the reference count comparator 214 (302), clearing the detection counter 208 and the reference counter 212 (304), and enabling the detection oscillator 104, detection counter 208, and reference counter 212 (306). As noted above, upon being enabled, the detection oscillator 104 begins generating and supplying the detection signal, the detection counter 208 begins counting the detection signal periods (or "clocks"), and the reference counter 212 begins counting the reference signal periods (or "clocks") supplied from the reference oscillator 102.

While the reference counter 212 is counting the reference signal periods and generating a reference count value, the reference count comparator 214 is monitoring the reference count value to determine whether it is equal to the predetermined comparator value (308). When the reference count value equals the predetermined comparator count value, the count capture circuit 216 is enabled and the controller 218 is notified (310). In response, the detection oscillator 104 is disabled (312), and the count capture circuit 216 captures the detection count value from the detection counter 208 (314). After the count capture circuit 216 has captured the reference count value, the controller 218 is once again notified. In response to this notification, the controller 218 clears the detection counter 208 and the reference counter 212 (316) to prepare the counters 208, 212 for the next sample, and stores the captured count value as the baseline count value (318), which is compared to subsequent samples.

Following establishment of the baseline count value (302-318), the monitor circuit 100 is enabled to obtain one or more subsequent samples. This is accomplished by once again enabling the detection oscillator 104, the detection counter 208, and the reference counter 212 (320) to begin generating and counting the detection signal periods and the reference signal periods. When the reference count value again equals the predetermined comparator count value, the count capture circuit 216 is enabled (324), the detection oscillator 104 is disabled (326), the count capture circuit 216 captures the detection count value from the detection counter 208 (328), and the controller 218 clears the detection counter 208 and the reference counter 212 (330) and stores the captured count value (332).

After storing the captured count value, the controller 218 compares the captured count value to the previously stored baseline count value to determine whether the two count values differ by a predetermined threshold (334). If the two count values do not differ by the predetermined threshold, indicating that it is unlikely the circuit or system are being subjected to a tampering technique, then the monitor circuit 100 is once again enabled to take yet another sample of the reference oscillator 102 for comparison with the baseline count value (320-332). If, however, the two count values do differ by the predetermined threshold, this indicates that it is likely the circuit or system are being subjected to one or more tampering techniques. As a result, the controller 218 will generate the tamper detect signal (336), which may be appropriately processed, either as previously described or as will now be described.

In one exemplary embodiment, which was not previously mentioned, if the tamper detect signal is generated, only the monitor circuit 100 will initially be reset, rather than the entire circuit or system that is being monitored. Following the reset, the monitor circuit 100 establishes a new baseline count value (302-318), and then continues with subsequent comparisons (320-336). If the number of monitor circuit 100 resets reaches a predetermined value, such would indicate the high likelihood of either a tamper event or device failure, at which point a full circuit or system reset may be implemented, or other suitable actions taken. This particular embodiment, which provides the ability to establish a new baseline count value, allows for some desensitizing of the tamper monitor circuit 100.

Before proceeding further it is noted that, although the previous discussion focused on detection of variations in the frequency of the detection oscillator 104, the monitor circuit 100 will also detect variations in the reference oscillator 102. A captured reference count value that differs from the baseline count value by the predetermined threshold could indicate either a variation in detection oscillator frequency or a variation in reference oscillator frequency. Thus, the monitor circuit 100 can simultaneously detect either voltage or temperature manipulations or reference oscillator manipulations.

Figure 4:
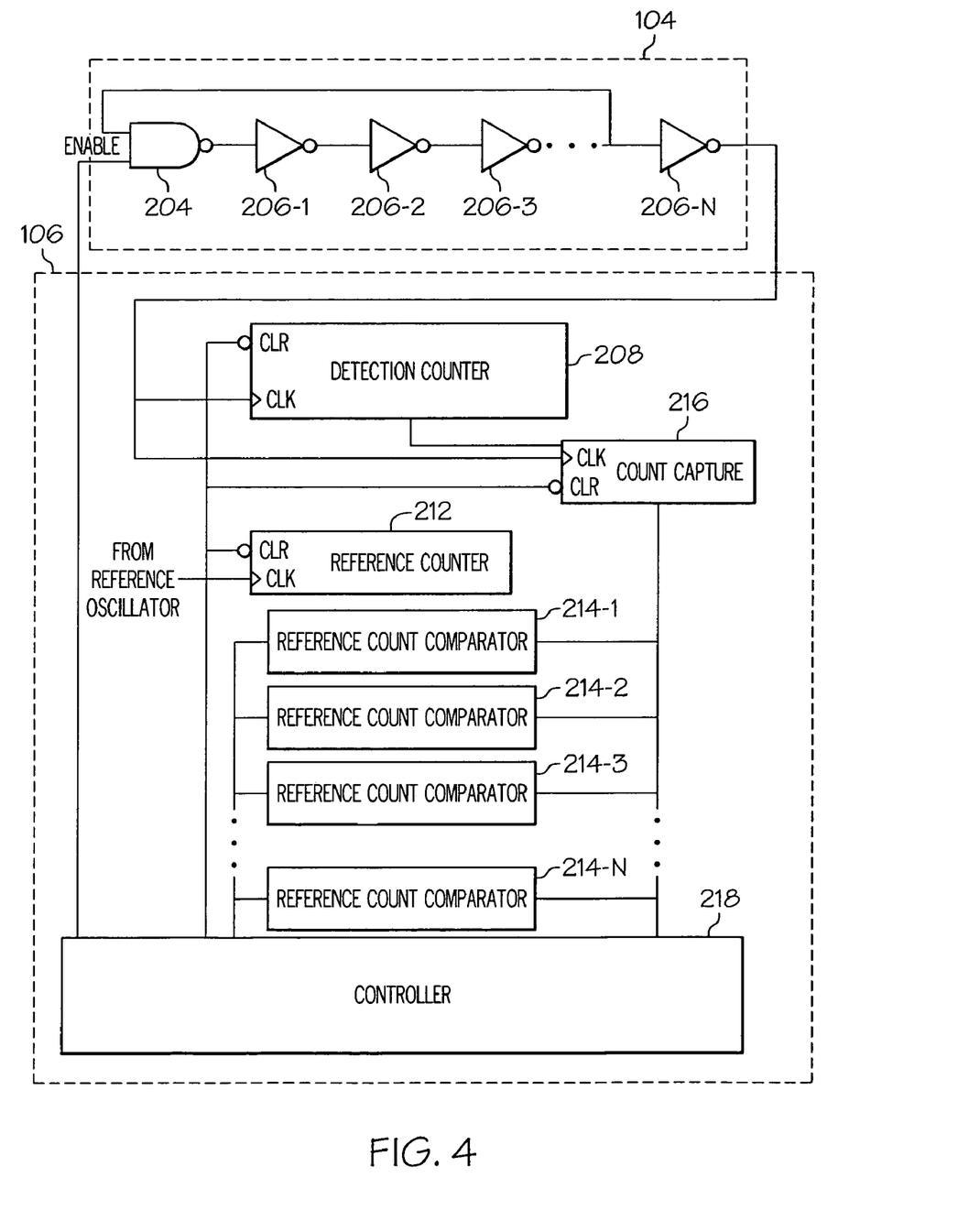
FIG. 4 is a functional block diagram, similar to that shown in FIG. 2, depicting portions of an alternative embodiment of the tamper monitor circuit.

The monitor circuit 100 depicted in FIG. 2 and described above is merely exemplary of one particular embodiment and, as previously mentioned, may vary in implementation. For example, as depicted in FIG. 4, the monitor circuit 100 may be implemented with multiple reference count comparators 214-1, 214-2, 214-3, . . . 214-N. With multiple reference count comparators 214-1, 214-2, 214-3, . . . 214-N, each loaded with a different comparator count value, multiple detection count values can be captured and compared to the baseline count value. It will be appreciated that relatively small comparator values allow detection of large variances in voltage or temperature, and relatively large comparator values allow for detection of smaller variances. The selection of relatively large and small comparison count values can be used to allow for earlier detection of larger variations, with the overall sample rate being determined by the largest comparison count value. It will be appreciated that this same functionality can be realized with a single reference count comparator 214, if the controller 218 is configured to selectively modify the comparator count value loaded into the reference count comparator 214, to allow for relatively smaller and relatively larger counts.

The monitor circuit 100 described herein is preferably implemented, as previously noted, using a reference oscillator 102 that is asynchronous to the detection oscillator 104. Thus, the comparison of the two count values generated by these oscillators 102, 104 provides a cross checking mechanism. The fact that the detection oscillator frequency is dependent on voltage and temperature, while the reference oscillator 102 is less susceptible to voltage and temperature variations validates the comparison implemented by the monitor circuit 100. Indeed, matching these two unrelated oscillator frequencies in a consistent manner while varying voltage, temperature and/or reference oscillator frequency is highly unlikely. Thus, the tamper monitor circuit 100 described herein is considered to be fairly robust in its tamper detection capabilities.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A tamper monitor circuit, comprising:
   a reference oscillator operable to supply a reference signal having a reference frequency;
   a detection oscillator configured to operate at a circuit temperature and to be energized with a supply voltage, the detection oscillator operable to supply a detection signal having a frequency that varies with variations in the circuit temperature, variations in the supply voltage, or both; and
   a comparison circuit coupled to receive the reference signal and the detection signal and operable, in response to the reference signal, to (i) selectively determine the frequency of the detection signal, (ii) determine a frequency difference between two or more of the determined frequencies, and (iii) supply a tamper detect signal if the determined frequency difference exceeds a predetermined difference threshold;
   wherein the comparison circuit includes a detection counter coupled to receive the detection signal and operable to generate a detection count value representative of a number of detection signal periods; and
   a detection count capture circuit coupled to the detection counter and configured to receive a count capture command, the count capture circuit operable, in response to the count capture command, to capture the detection count value.

2. The circuit of claim 1, wherein the comparison circuit further comprises:
   a reference counter coupled to receive the reference signal and operable to generate a reference count value representative of a number of reference signal periods; and
   a reference count comparator coupled to the reference counter, the reference count comparator operable to determine when the reference count value reaches a predetermined comparator count value and, upon determining that the reference count reaches the predetermined comparator count value, to supply the count capture command.

3. The circuit of claim 2, further comprising:
   a controller circuit coupled to the reference count comparator circuit and operable to supply the predetermined comparator count value thereto.

4. The circuit of claim 3, wherein:
   the detection count capture circuit is further operable, upon capturing the detection count value, to supply a count capture notification signal;
   the controller circuit, in response to the count capture notification signal, retrieves the detection count value and supplies a counter clear signal;
   the detection counter is coupled to receive the counter clear signal and is operable, in response thereto, to clear the detection count value; and
   the reference counter is coupled to receive the counter clear signal and is operable, in response thereto, to clear the reference count value.

5. The circuit of claim 1, wherein the comparison circuit further comprises:
   a controller circuit coupled to the detection count capture circuit and operable to (i) selectively retrieve the detection count value from the detection count capture circuit and (ii) compare the retrieved detection count value to a baseline detection count value.

6. The circuit of claim 5, wherein the controller circuit supplies the tamper detect signal if the retrieved detection count value differs from the baseline detection count value by a predetermined threshold magnitude.

7. The circuit of claim 5, wherein the controller circuit is further operable to selectively reset the baseline detection count value equal to the retrieved detection count value.

8. The circuit of claim 7, wherein the controller circuit resets the baseline detection count value if the retrieved detection count value differs from the baseline detection count value by a predetermined threshold magnitude.

9. The circuit of claim 8, wherein the controller circuit is further operable to:
   determine a reset count representative of a number of times the baseline detection count value is reset; and
   supply the tamper detect signal if the reset count exceeds a predetermined number.

10. The circuit of claim 5, wherein:
    the controller circuit is further operable to supply a detection oscillator enable signal;
    the detection oscillator is coupled to receive the detection oscillator enable signal and is operable, upon receipt thereof, to supply the detection signal.

11. The circuit of claim 10, wherein:
    the detection count capture circuit is further operable, upon capturing the detection count value, to supply a count capture notification signal; and
    the controller circuit, in response to the count capture notification signal, retrieves the detection count value and ceases supplying the detection oscillator enable signal, to thereby inhibit the detection oscillator from supplying the detection signal.

12. The circuit of claim 1, wherein:
    the reference oscillator is configured to operate at a reference circuit temperature and is energized with the supply voltage;
    the reference signal frequency varies, in accordance with a first sensitivity, with variations in the reference circuit temperature, the supply voltage, or both; and
    the detection signal frequency varies, in accordance with a second sensitivity that differs from the first sensitivity, with variations in the circuit temperature, the supply voltage, or both.

13. A tamper monitor circuit, comprising:
    a reference oscillator configured to operate at a first circuit temperature and to be energized with a supply voltage, the reference oscillator operable to supply a reference signal having a frequency that varies, in accordance with a first sensitivity, with variations in the first circuit temperature, variations in the supply voltage, or both; and
    a detection oscillator configured to operate at a second circuit temperature and to be energized with the supply voltage, the detection oscillator operable to supply a detection signal having a frequency that varies, in accordance with a second sensitivity that differs from the first sensitivity, with variations in the second circuit temperature, variations in the supply voltage, or both; and
    a comparison circuit coupled to receive the reference signal and the detection signal and operable, in response to the reference signal, to (i) selectively determine the frequency of the detection signal, (ii) determine a frequency difference between two or more of the determined frequencies, and (iii) supply a tamper detect signal if the determined frequency difference exceeds a predetermined difference threshold.

14. The circuit of claim 13, wherein the comparison circuit comprises:
- a detection counter coupled to receive the detection signal and operable to generate a detection count value representative of a number of detection signal periods;
- a reference counter coupled to receive the reference signal and operable to generate a reference count value representative of a number of reference signal periods;
- a reference count comparator coupled to the reference counter, the reference count comparator operable to determine when the reference count value reaches a predetermined comparator count value and, upon determining that the reference count reaches the predetermined comparator count value, to supply a count capture command; and
- a detection count capture circuit coupled to the detection counter and the reference count comparator, the detection count capture circuit coupled to receive the count capture command and operable, in response thereto, to capture the detection count value.

15. The circuit of claim 14, further comprising:
a controller circuit coupled to the reference count comparator circuit and operable to supply the predetermined comparator count value thereto.

16. The circuit of claim 14, wherein:
- the detection count capture circuit is further operable, upon capturing the detection count value, to supply a count capture notification signal;
- the controller circuit, in response to the count capture notification signal, retrieves the detection count value and supplies a counter clear signal;
- the detection counter is coupled to receive the counter clear signal and is operable, in response thereto, to clear the detection count value; and
- the reference counter is coupled to receive the counter clear signal and is operable, in response thereto, to clear the reference count value.

17. The circuit of claim 14, wherein the comparison circuit further comprises:
a controller circuit coupled to the detection count capture circuit and operable to (i) selectively retrieve the detection count value from the detection count capture circuit and (ii) compare the retrieved detection count value to a baseline detection count value.

18. The circuit of claim 17, wherein the controller circuit is further operable to:
- reset the baseline detection count value if the retrieved detection count value differs from the baseline detection count value by a predetermined threshold magnitude;
- determine a reset count representative of a number of times the baseline detection count value is reset; and
- supply the tamper detect signal if the reset count exceeds a predetermined number.

19. A tamper monitor circuit, comprising:
- a reference oscillator operable to supply a reference signal having a reference frequency;
- a detection oscillator configured to operate at a circuit temperature and to be energized with a supply voltage, the detection oscillator operable to supply a detection signal having a frequency that varies with variations in the circuit temperature, variations in the supply voltage, or both;
- a detection counter coupled to receive the detection signal and operable to generate a detection count value representative of a number of detection signal periods;
- a reference counter coupled to receive the reference signal and operable to generate a reference count value representative of a number of reference signal periods;
- a reference count comparator coupled to the reference counter, the reference count comparator operable to determine when the reference count value reaches a predetermined comparator count value and, upon determining that the reference count reaches the predetermined comparator count value, to supply a count capture command; and
- a detection count capture circuit coupled to the detection counter and the reference count comparator, the detection count capture circuit coupled to receive the count capture command and operable, in response thereto, to capture the detection count value; and
- a controller circuit coupled to the detection count capture circuit and operable to:
  (i) selectively retrieve the detection count value from the detection count capture circuit,
  (ii) compare the retrieved detection count value to a baseline detection count value, and
  (iii) supply a tamper detect signal if the retrieved detection count value differs from the baseline detection count value by a predetermined threshold magnitude.

20. A tamper monitor circuit comprising:
- a reference oscillator for supplying a reference signal having a reference frequency,
- a detection oscillator configured to generate a detection signal having a detection frequency dependent on variations in both supply voltage and circuit temperature, and
- a comparison circuit for comparing the detection signal to the reference signal and providing a tamper detect signal, if the detection frequency is different from the reference frequency by a predetermined threshold value.

21. The tamper monitor circuit of claim 20, including
a detection counter coupled to the detection oscillator for generating a detection count value based on a number of detection signal periods,
wherein the detection frequency is determined based on the detection count value.

* * * * *

UNITED STATES PATENT AND TRADEMARK OFFICE
CERTIFICATE OF CORRECTION

PATENT NO. : 7,385,491 B2
APPLICATION NO. : 11/238480
DATED : June 10, 2008
INVENTOR(S) : Bryan C. Doi It is certified that error appears in the above-identified patent and that said Letters Patent is hereby corrected as shown below:

Col. 1, line 3; Before the first paragraph of the specification please insert, --This invention was made with Government support under Contract Number W31P4Q-06-C-0383 awarded by the US Army Aviation and Missile Command. The Government has certain rights in the invention.--

Signed and Sealed this

Twenty-sixth Day of May, 2009

JOHN DOLL
*Acting Director of the United States Patent and Trademark Office*